Jan. 25, 1927.
E. E. STEUDE
1,615,349
RESILIENT WHEEL
Filed August 24, 1925
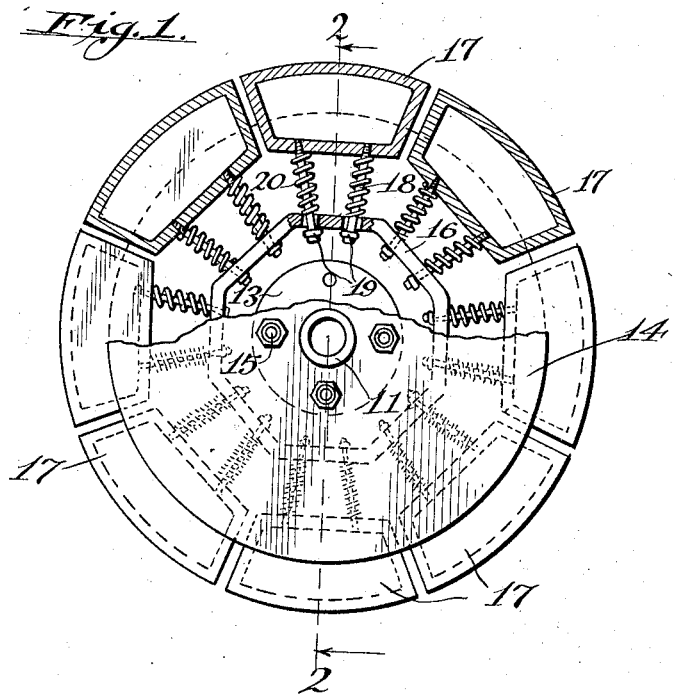
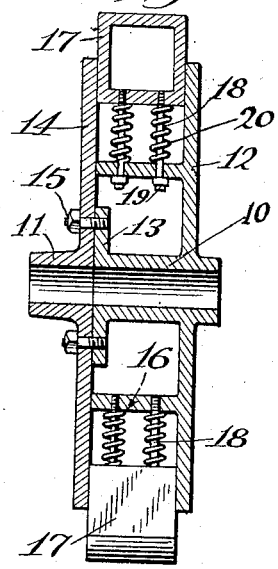
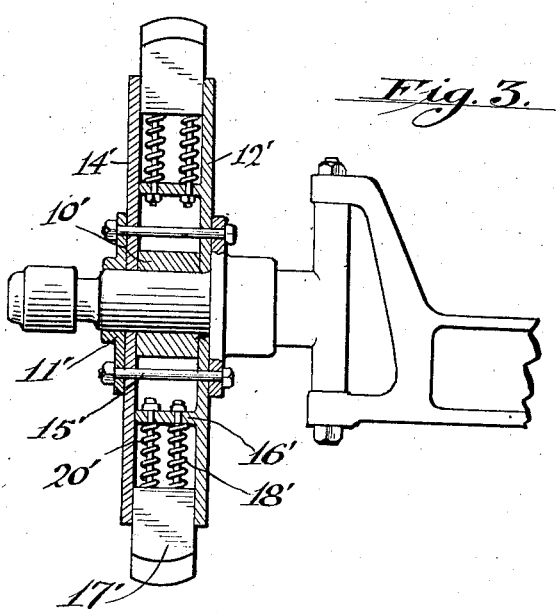
Inventor
Ernest E. Steude,
By Hazard and Miller
Attorneys.
Witness:
W. P. Hall Patented Jan. 25, 1927.

1,615,349

UNITED STATES PATENT OFFICE.

ERNEST E. STEUDE, OF SAUGUS, CALIFORNIA.

RESILIENT WHEEL.

Application filed August 24, 1925. Serial No. 52,091.

This invention relates to improvements in resilient wheels, which are particularly adapted to be used upon vehicles and the like.

An object of the invention is to provide an improved resilient wheel which consists essentially of a hub having a pair of spaced flanges, between which are slidable tread members. These tread members are provided with springs urging them into their outermost position between the flanges and have means for limiting their outward movement and also preventing their circumferential movement between the flanges. By the improved construction a wheel is provided which does not employ rubber, but has the same advantages of the conventional wheel having a pneumatic rubber tire.

With the foregoing and other objects in view which will be made manifest in the following detailed description and specifically pointed out in the appended claim, reference is had to the accompanying drawings for an illustrative embodiment of the invention, wherein:

Figure 1 is a side elevation of the wheel, parts being broken away and shown in section, Fig. 2 is a vertical section taken substantially on the line 2—2 of Fig. 1, and Fig. 3 is a sectional view illustrating a slightly modified form of construction as applied to the front spindle of an automobile.

Referring to the accompanying drawings wherein similar reference characters designate similar parts througout, the wheel shown in Figs. 1 and 2 consists of two hub sections 10 and 11, which cooperate to form the hub of the constructed wheel. The hub section 10 has a large flange 12 and a small flange 13, and the hub section 11 has a large flange 14. Bolts or cap screws 15 extend through the flange 14 on the hub section 11 and into the small flange 13 on the hub section 10 securing the two hub sections together. About the hub section 10 a web 16 is formed on the flange 12 which extends across the space between the flanges 12 and 14.

A plurality of tread members 17 have arcuate outer surfaces and have end faces which are arranged along radii from the center or hub of the wheel. These tread members are slidable between the flanges 12 and 14. Bolts or tie members 18 are secured to the inner sides of the tread members and extend through apertures in the web 16 so as to be slidable therein. The inner ends of the bolts 18 are provided with nuts 19 engageable on the web 16 so as to limit the outward movement of the tread members 17 between the flanges 12 and 14. Coil springs 20 are disposed about the bolts 18 and are compressed between the web 16 and the tread members 17. These springs urge the tread members into their outermost positions between the flanges 12 and 14 but permit the tread members to move inwardly toward the center of the wheel. Preferably, there are four bolts secured to each tread member, these bolts being arranged in pairs which are in alignment longitudinally or axially of the wheel. The bolts forming each pair also are arranged upon a radius from the center of the hub.

From the improved construction it will be readily appreciated that a resilient wheel is provided consisting of a plurality of separate tread members which are slidable between two spaced flanges. Means is provided for limiting the outward movement of the tread members and the tread members are urged into outermost position by means of springs which permit the tread members to move inwardly because of their resiliency. In order to lighten the wheel, the tread members 17 are preferably made hollow, as clearly shown upon the drawing.

In the modification shown in Fig. 3 there are flanges 12' and 14' with a hub 10' which is receivable upon the spindle or axle of a vehicle. A suitable apertured plate 11' is positioned against the flange 14' and bolts 15' extend through the plate 11' through the two flanges and into a flange on the spindle or axle, thus securing the flanges together upon the spindle. The remainder of the construction of the modification shown in Fig. 3 is the same as that shown in Fig. 1, there being the web 16', the bolts 18', coil spring 20' and tread members 17'.

It will be understood that various changes in the detail of construction may be made without departing from the spirit or scope of the invention as defined by the appended claim.

I claim:

A resilient wheel comprising a hub, parallel flanges upon the hub, a polygonal web integral with one flange and bridging the space between that flange and the other flange, means connecting the flanges together, a plurality of hollow tread elements slidable between the flanges adjacent their edges, bolts rigidly connected to said tread elements and slidably extending through apertures in the polygonal web, and coil springs compressed about the bolts between the hollow tread elements and the polygonal web urging the tread elements into their outermost positions.

In testimony whereof I have signed my name to this specification.

ERNEST E. STEUDE.